US012794348B2

(12) United States Patent
Lee et al.

(10) Patent No.: US 12,794,348 B2
(45) Date of Patent: Nov. 10, 2026

(54) POWER CONVERSION DEVICE FOR POWER FROM PHOTOVOLTAIC DEVICE AND GRID

(71) Applicant: LG INNOTEK CO., LTD., Seoul (KR)

(72) Inventors: Seung Min Lee, Seoul (KR); Dong Keun Yoon, Seoul (KR); Seong Jae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 217 days.

(21) Appl. No.: 18/711,196

(22) PCT Filed: Nov. 18, 2022

(86) PCT No.: PCT/KR2022/018322

§ 371 (c)(1),
(2) Date: May 17, 2024

(87) PCT Pub. No.: WO2023/090941

PCT Pub. Date: May 25, 2023

(65) Prior Publication Data

US 2025/0007387 A1 Jan. 2, 2025

(30) Foreign Application Priority Data

Nov. 18, 2021 (KR) ........................ 10-2021-0159090

(51) Int. Cl.
*H02M 1/10* (2006.01)
*H02J 3/32* (2006.01)
(Continued)

(52) U.S. Cl.
CPC ................. *H02M 1/10* (2013.01); *H02J 3/32* (2013.01); *H02J 7/35* (2013.01); *H02S 40/30* (2014.12); *H02J 2101/24* (2026.01)

(58) Field of Classification Search
CPC ... H02M 1/10; H02S 40/30; H02J 3/32; H02J 7/35; H02J 2101/24
(Continued)

(56) References Cited

U.S. PATENT DOCUMENTS 9,871,379 B2 * 1/2018 Cheng ..................... H02M 7/44
10,516,365 B1 * 12/2019 Serban ..................... H02J 7/35
(Continued)

FOREIGN PATENT DOCUMENTS

CN 201436775 4/2010
EP 3447883 A1 * 2/2019 ............. H02J 7/865
(Continued)

OTHER PUBLICATIONS

International Search Report dated Mar. 6, 2023 issued in Application No. PCT/KR2022/018322.

*Primary Examiner* — Yemane Mehari
(74) *Attorney, Agent, or Firm* — KED & ASSOCIATES, LLP

(57) ABSTRACT

The present invention relates to an auxiliary power supply device for generating auxiliary power of a power conversion device, the auxiliary power supply device comprising: a first auxiliary power supply unit which receives power applied from a photovoltaic module and generates auxiliary power therefrom; a second auxiliary power supply unit which receives power applied from a grid and generates auxiliary power therefrom; and a driving unit which can selectively drive the second auxiliary power supply unit according to the magnitude of voltage of the photovoltaic module. Accordingly, the present invention has an advantage in that an auxiliary power supply can be normally operated even in an environment where photovoltaic power generation is not performed.

18 Claims, 9 Drawing Sheets

(51) Int. Cl.
*H02J 7/35* (2006.01)
*H02S 40/30* (2014.01)
*H02J 101/24* (2026.01)

(58) Field of Classification Search
USPC ............................................................ 363/13
See application file for complete search history.

(56) References Cited

U.S. PATENT DOCUMENTS

| | | | | |
|---|---|---|---|---|
| 2012/0235486 | A1* | 9/2012 | Li | H02J 7/35<br>307/64 |
| 2014/0239724 | A1* | 8/2014 | Ishikawa | H02J 3/32<br>307/66 |
| 2015/0333524 | A1* | 11/2015 | Nishikawa | H02J 3/32<br>307/26 |
| 2017/0047741 | A1* | 2/2017 | Narla | H02J 3/00 |
| 2018/0329382 | A1* | 11/2018 | Somani | H02J 3/32 |
| 2021/0255595 | A1* | 8/2021 | Somani | H02J 3/32 |

FOREIGN PATENT DOCUMENTS

| | | |
|---|---|---|
| JP | 05-184083 | 7/1993 |
| JP | 08-308247 | 11/1996 |
| JP | 2009-033892 | 2/2009 |

* cited by examiner

【FIG. 1】
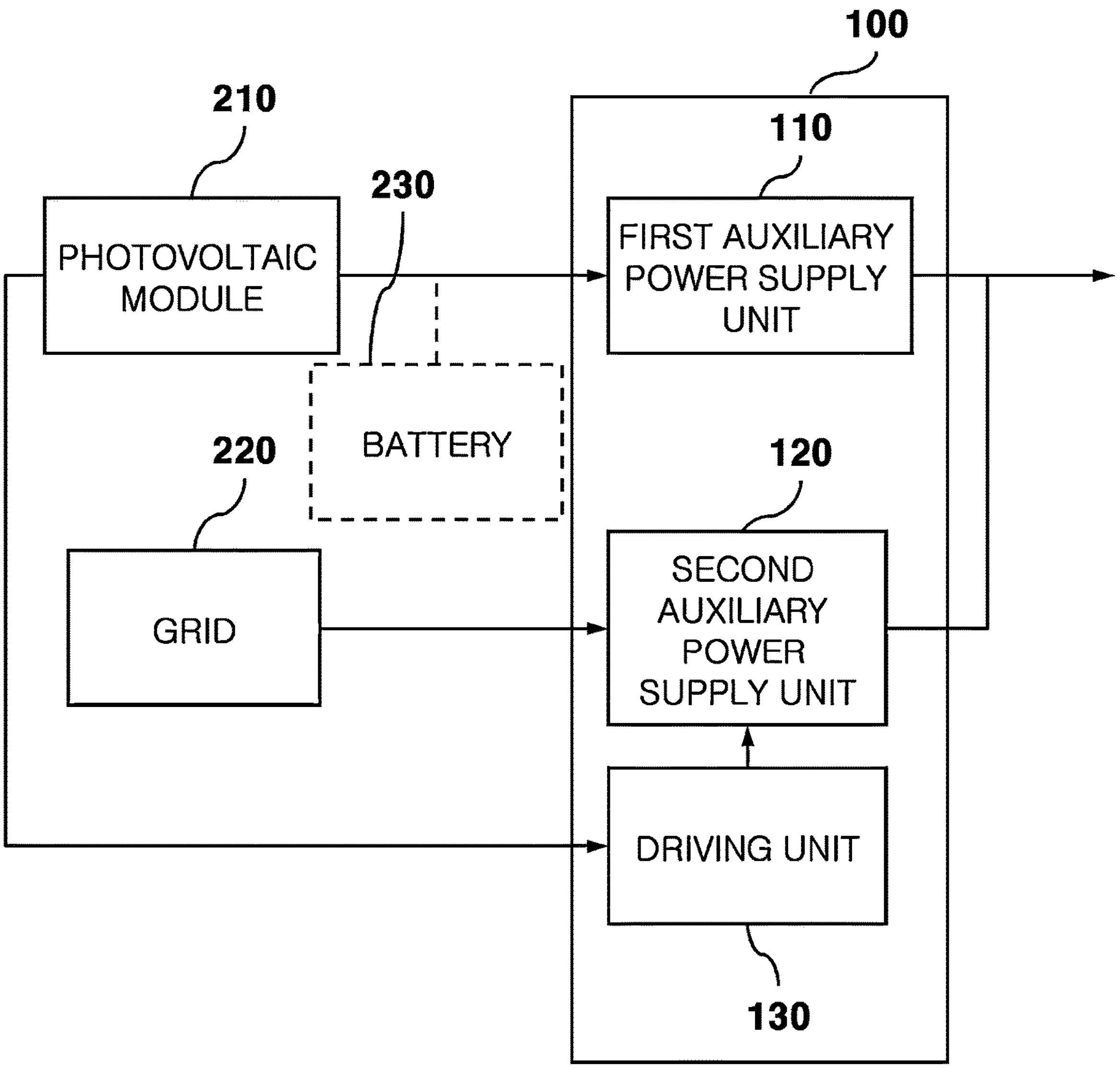

【FIG. 2】
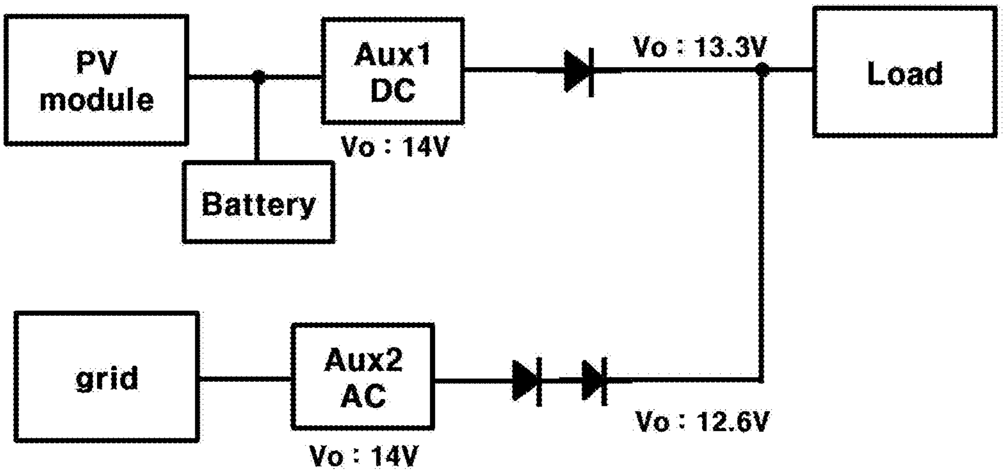
【FIG. 3】
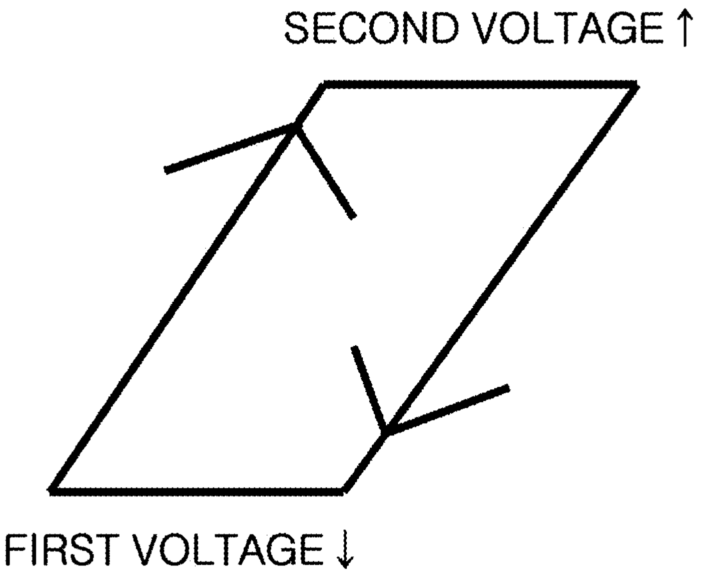

【FIG. 4】
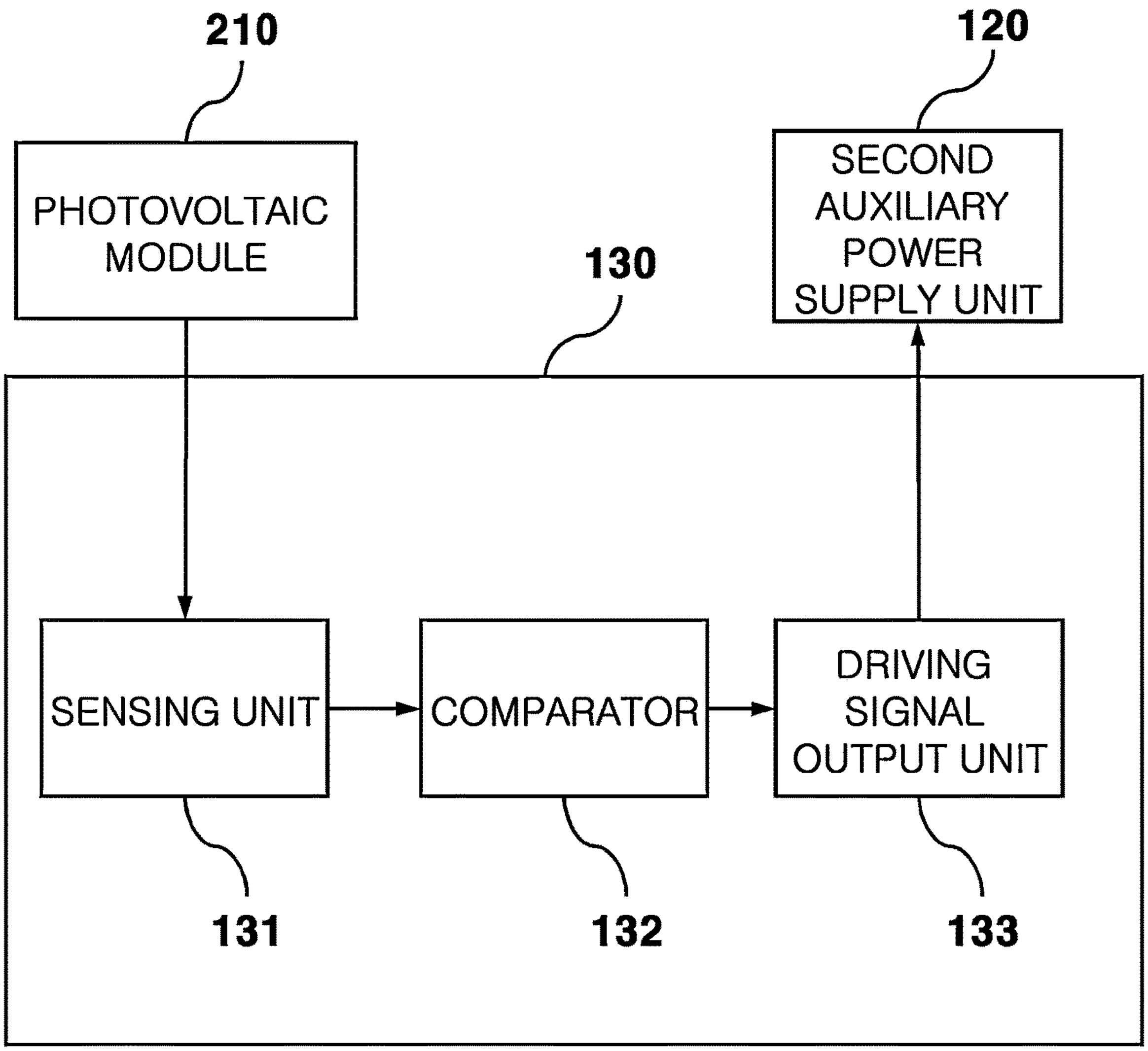

【FIG. 5】
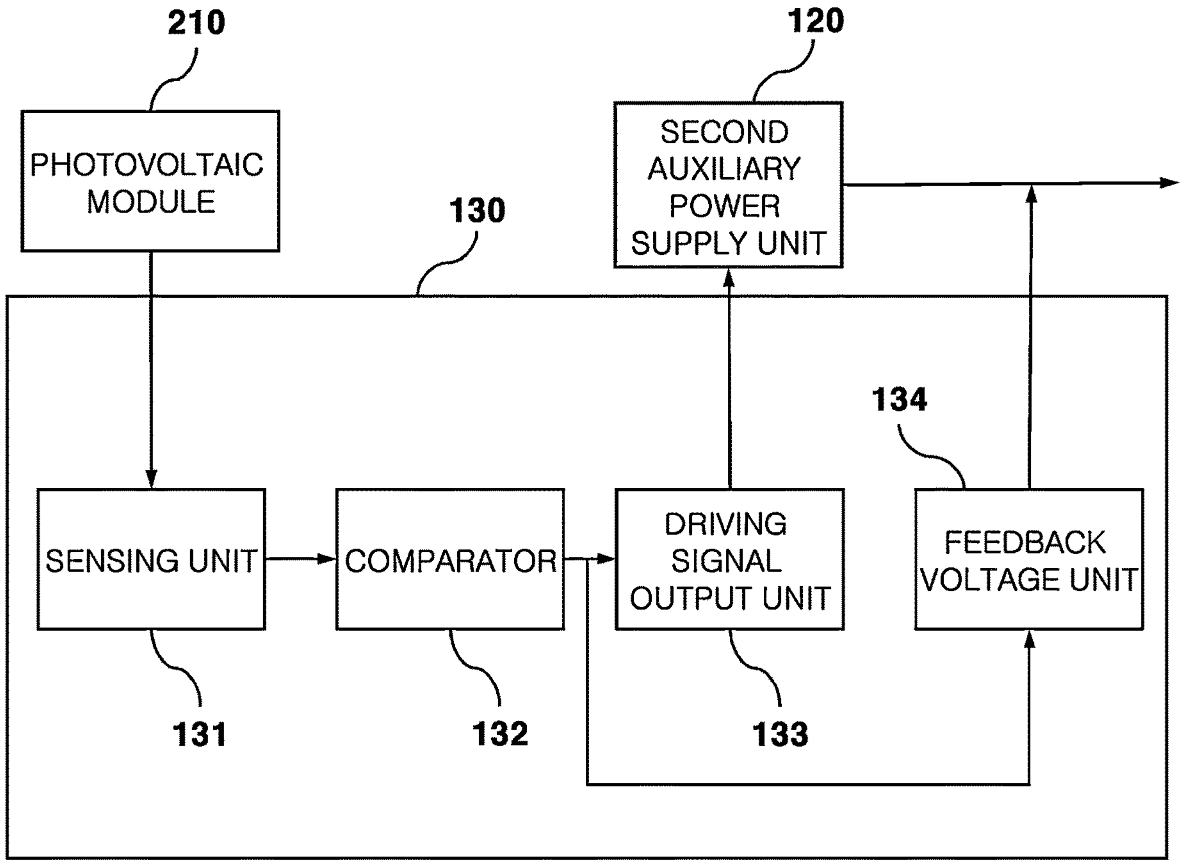

【FIG. 6】
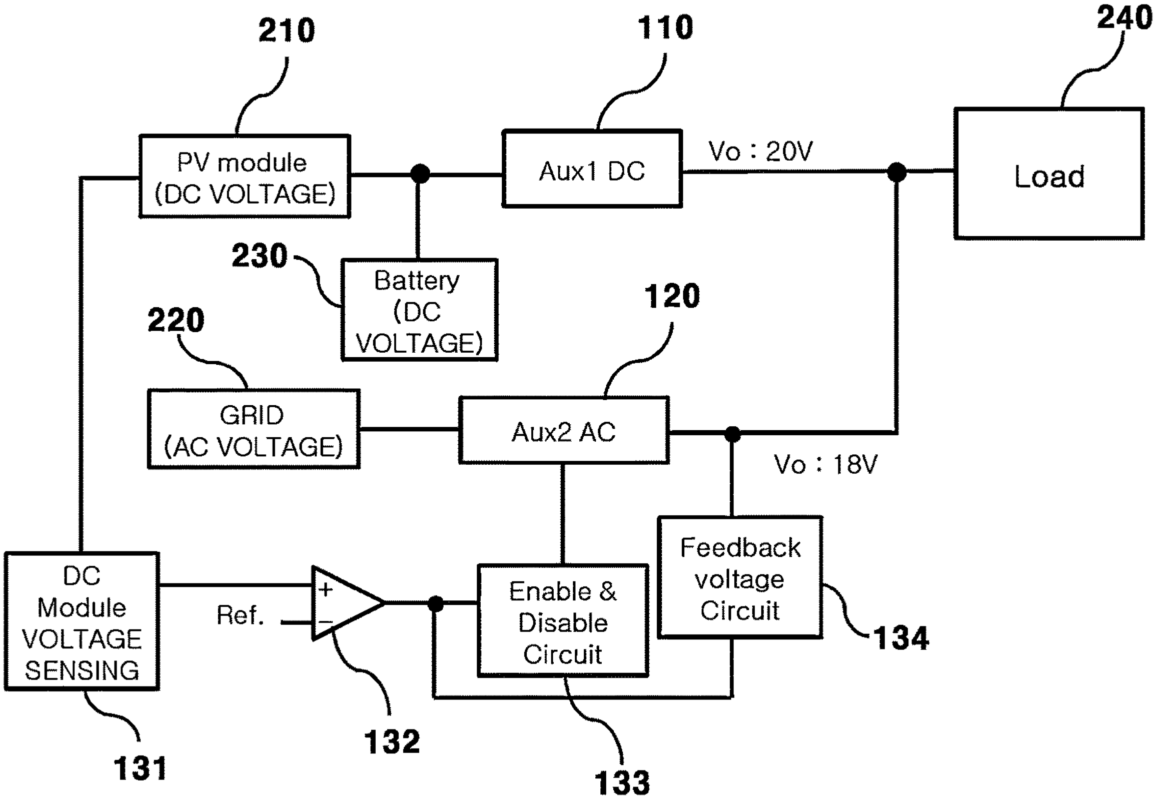

【FIG. 7】
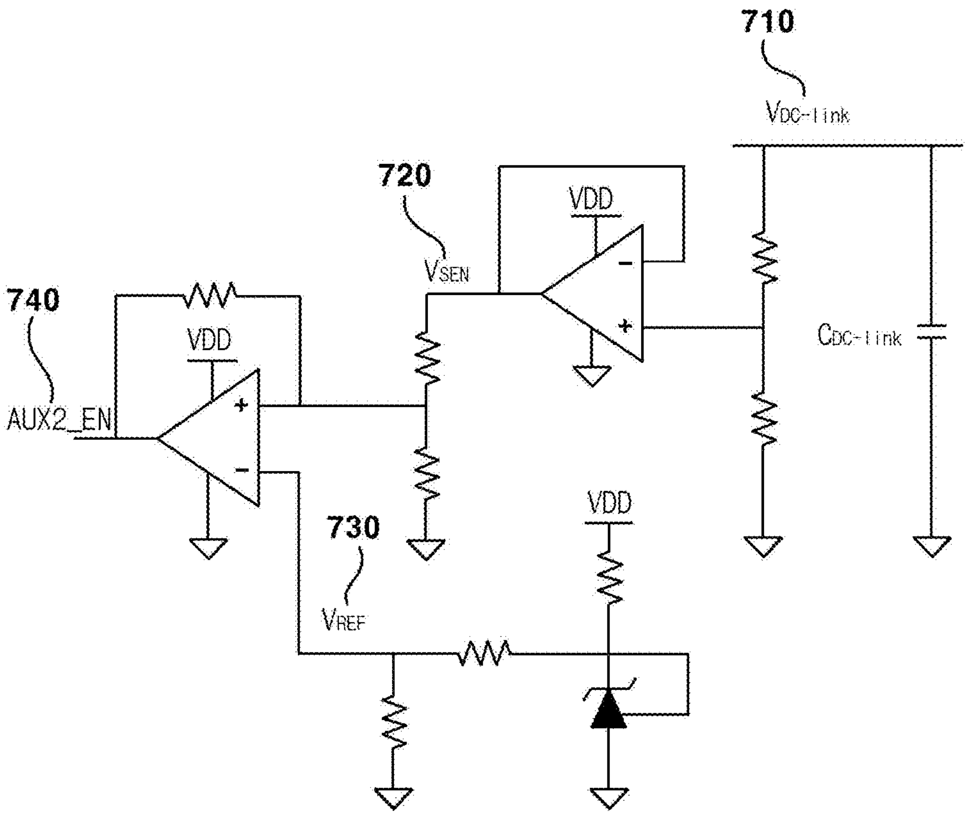

【FIG. 8】
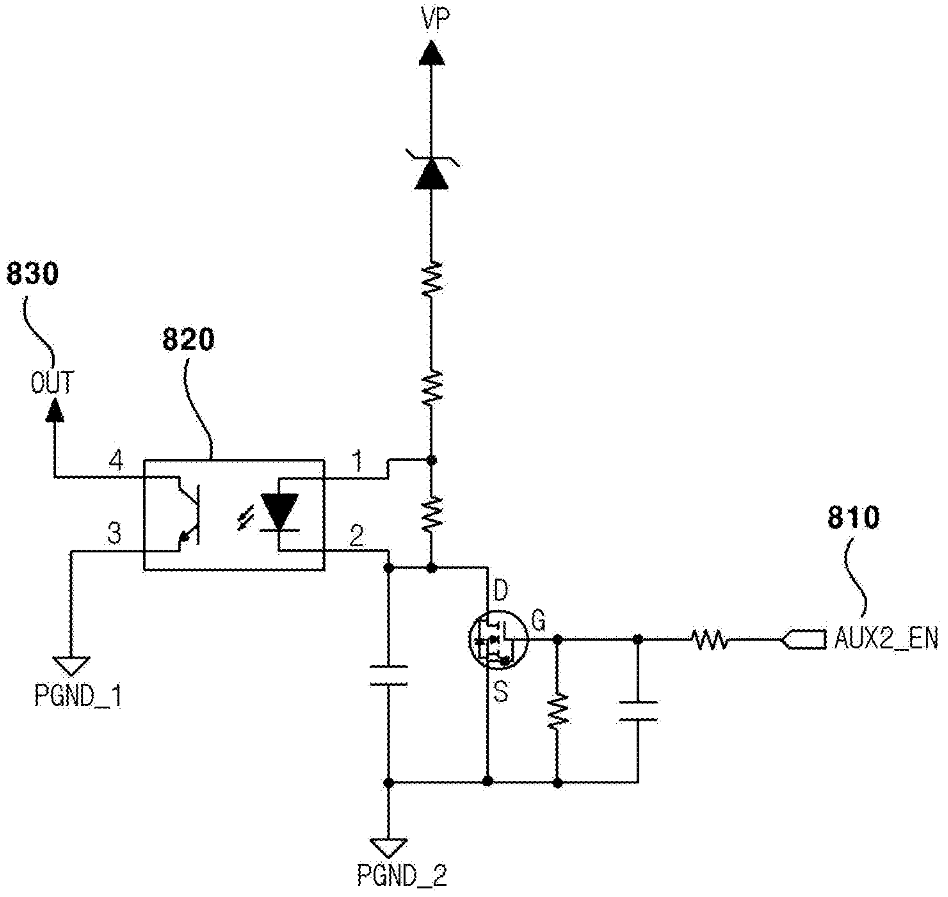

【FIG. 9】
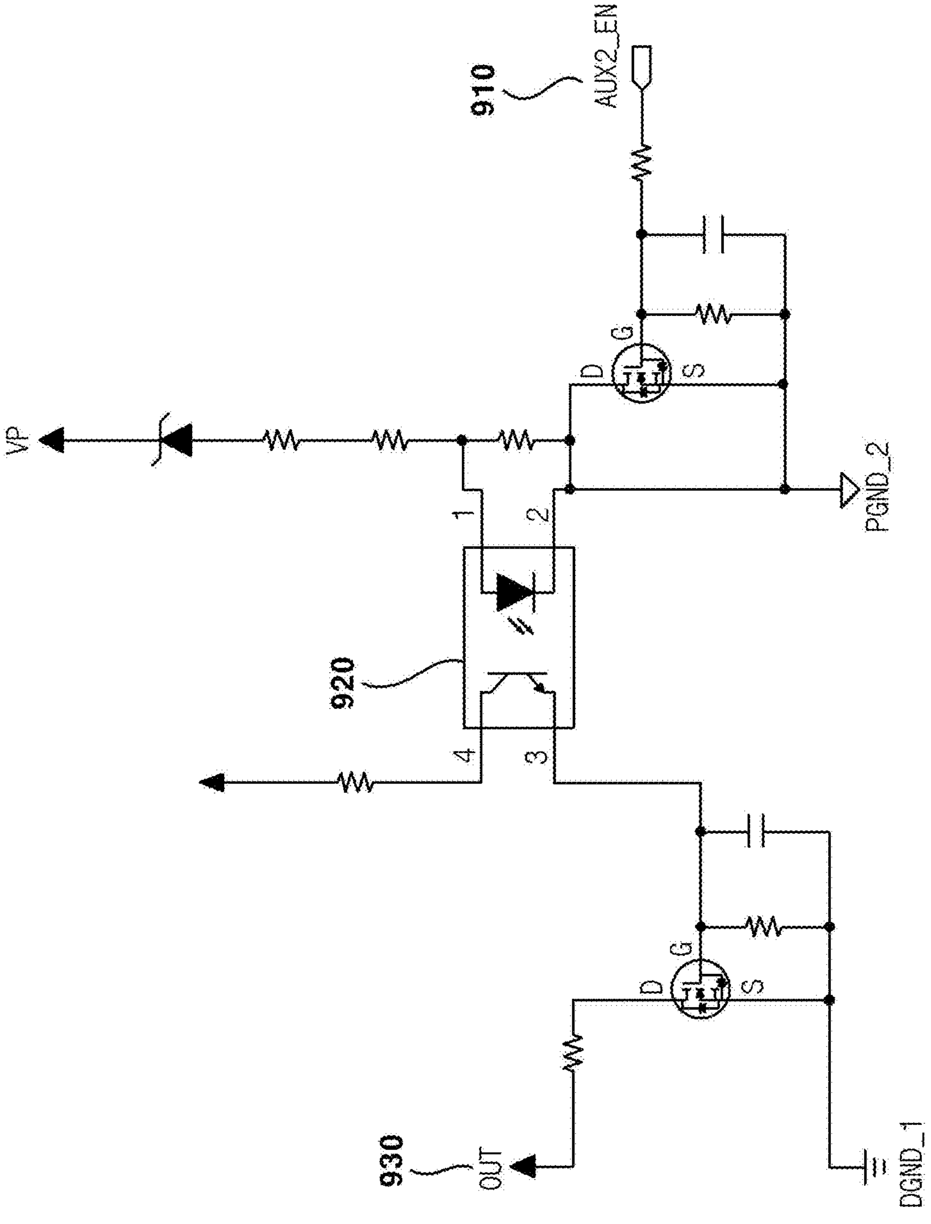

【FIG. 10】
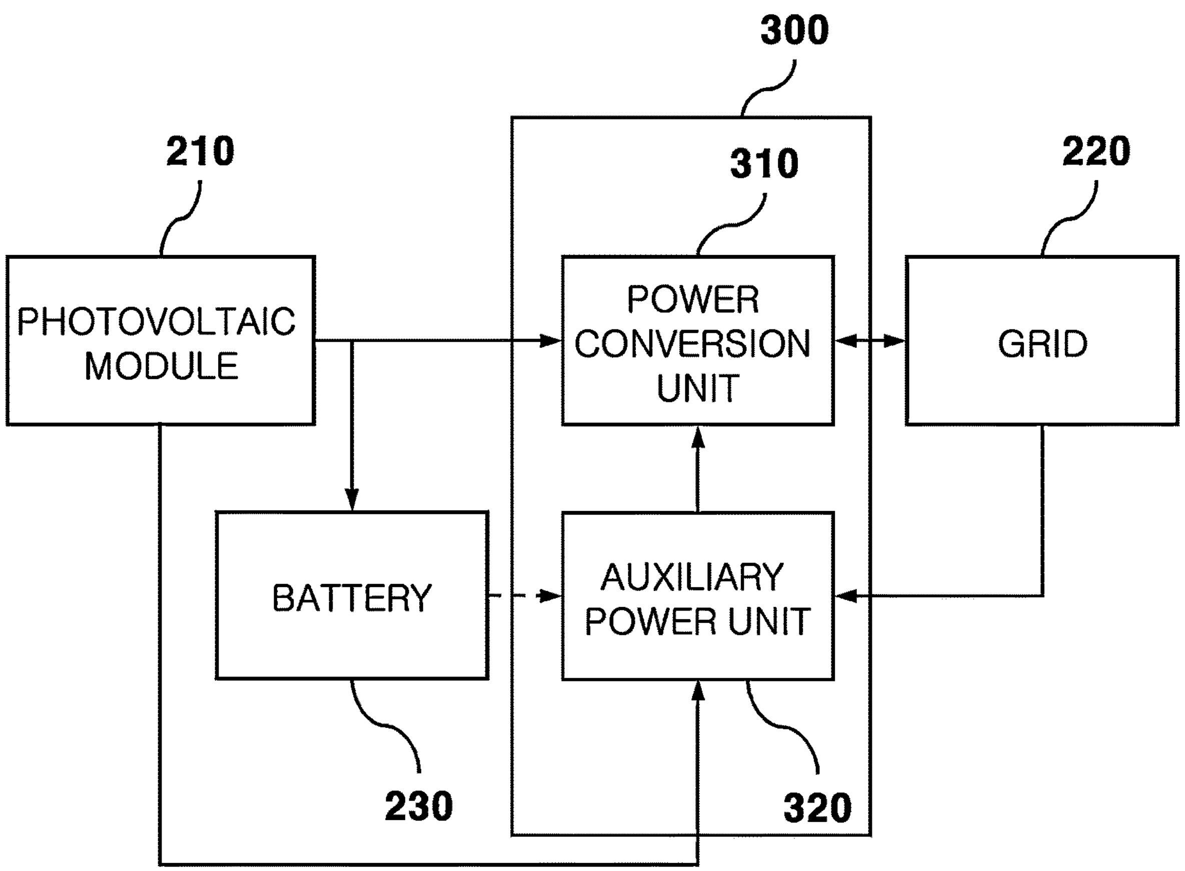

POWER CONVERSION DEVICE FOR POWER FROM PHOTOVOLTAIC DEVICE AND GRID

CROSS-REFERENCE TO RELATED PATENT APPLICATIONS

This application is a U.S. National Stage Application under 35 U.S.C. § 371 of PCT Application No. PCT/KR2022/018322, filed Nov. 18, 2022, which claims priority to Korean Patent Application No. 10-2021-0159090, filed Nov. 18, 2021, whose entire disclosures are hereby incorporated by reference.

TECHNICAL FIELD

The present invention relates to a power conversion device, and more particularly to an auxiliary power supply device that efficiently generates an auxiliary power supply for a power conversion device and the power supply device including the auxiliary power supply device.

BACKGROUND ARTS

Photovoltaic power generation is an eco-friendly energy generation method that has been widely used to replace conventional chemical and nuclear power generation. Photovoltaic power generation is divided into stand-alone type, where batteries are connected to the converter, and grid-connected type, where batteries are connected to the power grid. Generally, stand-alone power generation consists of solar cells, storage batteries, power conversion devices, etc.

In a grid-connected system, an inverter that converts the power generated by the solar panels into electricity is used to provide power to the grid, and an auxiliary power source is required to drive the inverter. The auxiliary power to drive the inverter must be provided regardless of whether the photovoltaic panels are generating power or not, and techniques are needed to efficiently generate the auxiliary power in situations where photovoltaic power is not generated, such as at night.

DETAILED DESCRIPTION OF THE INVENTION

Technical Subject

The technical problem that the present invention seeks to solve is to provide an auxiliary power supply device that efficiently generates auxiliary power for a power conversion device, and a power conversion device including the auxiliary power supply device.

Technical Solution

In one general aspect of the present invention to solve the technical subject, an auxiliary power supply device for generating auxiliary power of power conversion device, comprising: a first auxiliary power supply unit which receives power applied from a photovoltaic module and generates auxiliary power therefrom; a second auxiliary power supply unit which receives power applied from a grid and generates auxiliary power therefrom; and a driving unit which outputs a driving signal to the second auxiliary power supply unit according to the magnitude of voltage of the photovoltaic module.

Preferably, but not necessarily, the driving unit may operate the second auxiliary power supply unit when the voltage of the photovoltaic module is below a first voltage, and stop operating the second auxiliary power supply unit when the voltage of the photovoltaic module is above a second voltage.

Preferably, but not necessarily, the first voltage may be lower than the second voltage.

Preferably, but not necessarily, the driving unit may include: a sensing unit for sensing a voltage of the photovoltaic module; a comparator for comparing the sensed voltage of the photovoltaic module with a reference voltage; and a driving signal output unit for outputting a driving signal to the second auxiliary power supply unit according to an output of the comparator.

Preferably, but not necessarily, the comparator may compare the voltage of the photovoltaic module with a first voltage or a second voltage.

Preferably, but not necessarily, the comparator may output a first signal when the voltage of the photovoltaic module is below a first voltage, and output a second signal when the voltage of the photovoltaic module is above a second voltage.

Preferably, but not necessarily, the driving signal output unit may include a first photocoupler, and when the comparator output is a first signal, the first photocoupler is not operated to output a first driving signal, and when the comparator output is a second signal, the first photocoupler is operated to output a second driving signal.

Preferably, but not necessarily, a feedback voltage unit may be included that lowers the output of the second auxiliary power supply unit to a third voltage or lower according to the output of the comparator.

Preferably, but not necessarily, the feedback voltage unit may include a second photocoupler, and when the output of the comparator is a first signal, the second photocoupler may be operated to reduce the output of the second auxiliary power supply unit to a third voltage or lower.

Preferably, but not necessarily, when the input voltage of the photovoltaic module and the grid is below a threshold, the first auxiliary power supply unit may receive power from a battery to generate auxiliary power.

To address the above technical challenges, a power conversion device according to an exemplary embodiment of the present invention may comprise:

- a power conversion unit that converts power inputted from a photovoltaic module and outputs it to the grid or charges a battery; and
- an auxiliary power supply unit that generates auxiliary power to operate the power conversion device, wherein the auxiliary power supply unit may include one of the auxiliary power supply devices described above.

Advantageous Effects

The exemplary embodiments of the present invention may be advantageous in that an unused auxiliary power unit may be switched off, thereby enabling efficient generation of auxiliary power and improving EMI characteristics.

BRIEF DESCRIPTION OF DRAWINGS

FIG. 1 is a block diagram of an auxiliary power supply device according to an exemplary embodiment of the present invention.

FIG. 2 is a comparative illustration of an auxiliary power supply device according to an exemplary embodiment of the present invention.

FIGS. 3 to 9 are drawings to illustrate an auxiliary power supply device according to an exemplary embodiment of the present invention.

FIG. 10 is a block diagram of a power conversion device according to an exemplary embodiment of the present invention.

BEST MODE

Hereinafter, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

Variations (Modifications) according to the present embodiments may include some configurations of each embodiment together with some configurations of other embodiments, i.e., a variation may include one embodiment of the various embodiments but omit some configurations and include some configurations of the corresponding other embodiments. Alternatively, the opposite may be true. The features, structures, effects, etc. described in the embodiments are included in at least one embodiment and are not necessarily limited to any one embodiment. Furthermore, the features, structures, effects, etc. exemplified in each embodiment may be combined or modified in other embodiments by one having ordinary knowledge in the field to which the embodiments belong. Accordingly, such combinations and modifications should be construed as being within the scope of the embodiments.

FIG. 1 is a block diagram of an auxiliary power supply device according to an exemplary embodiment of the present invention.

The auxiliary power supply device (100) according to an exemplary embodiment of the present invention may include a first auxiliary power supply unit (110), a second auxiliary power supply unit (120), and a driving unit (130).

The power conversion device providing the auxiliary power in the auxiliary power supply device according to an exemplary embodiment of the present invention may be a device that converts the power generated by the photovoltaic panels into power suitable for a load or a battery.

Photovoltaic (PV) panels use the photoelectric effect to generate electricity. The photoelectric effect is the emission of electrons when light of a certain frequency or higher strikes a certain metal material, and power is generated by forming a p-n junction using a p-type semiconductor and an n-type semiconductor, and generating a current using the electrons generated by the photoelectric effect. A photovoltaic panel includes a plurality of photovoltaic cells, and the photovoltaic cells are formed using silicon or the like, and may be formed in the form of a wafer. The photovoltaic panel is located in a field that can receive good sunlight, or on an outer wall of a building, a rooftop, or the like, and generates power using sunlight. In this case, the photovoltaic panels may be formed as BIPV (building-integrated photovoltaic power generation), which is formed integrally with the building.

The power generated by the solar panels is converted into power suitable for the electricity system, the grid, and transmitted to the grid using a power conversion device. An auxiliary power source is provided to drive the power conversion device to convert the power. For example, the power conversion device may include one or more switching elements, and in order for the switching elements to operate, an auxiliary power source, which is a power source different from a main power source from which the power is converted, must be supplied.

The auxiliary power supply device according to an exemplary embodiment of the present invention may include a first auxiliary power supply unit and a second auxiliary power supply unit for generating the auxiliary power supply source.

The first auxiliary power supply unit (110) may receive power from the photovoltaic module (210) to generate the auxiliary power supply source.

More specifically, the auxiliary power source is generated using power applied from the photovoltaic module (210). Here, photovoltaic module (210) may include a solar power panel, a converter to convert the power generated by the solar power panel, a maximum power point tracking controller to perform maximum power point tracking (MPPT), and the like. The power generated by the photovoltaic module (210) may be applied to the first auxiliary power supply unit (110) via a DC link. The first auxiliary power supply unit (110) may convert the power applied from the photovoltaic module (210) into a voltage or current of the auxiliary power supply source and delivers it to a load requiring the auxiliary power supply source. Here, the load is an element for operating the power conversion device, which may include a switching element, a controller, and the like.

The power applied from the photovoltaic module (210) is DC power, and the first auxiliary power supply unit (110) may include a power conversion circuit to generate auxiliary power using the DC power source. The first auxiliary power supply unit (110) may include a bootstrap circuit. Alternatively, it may include a buck converter or boost converter, a buck-boost converter, or the like.

The first auxiliary power supply unit (110) may receive power from a battery (230). Power generated by the photovoltaic module (210) may be fed to the battery via a DC link to charge the battery (230). The first auxiliary power supply unit (110) may receive power from the photovoltaic module (210) or the battery (230) to generate auxiliary power. Here, the first auxiliary power supply unit (110) may be a hybrid auxiliary power source.

The second auxiliary power supply unit (120) may receive power from a grid (220) to generate the auxiliary power.

More specifically, unlike the first auxiliary power supply unit (110), which generates auxiliary power by receiving power from the photovoltaic module (210), the second auxiliary power supply unit (120) may generate auxiliary power by receiving power from the grid (220). In a photovoltaic power generation system, the power conversion device can provide converted power to the grid (220) as well as receive power from the grid (220), which is a bidirectional power conversion. The power from the grid (220) may be used to charge the battery (230). Additionally, power from the grid (220) may be used by the second auxiliary power supply unit (120) to generate auxiliary power. The power from the grid (220) may be AC power, and the second auxiliary power supply unit (120) may include power conversion circuit to generate auxiliary power using the AC power. The second auxiliary power supply unit (120) may include a bootstrap circuit. Alternatively, it may include a buck converter or boost converter, a buck-boost converter, or the like.

The driving unit (130) may output a driving signal to the second auxiliary power supply unit (120) according to the magnitude of the voltage of the photovoltaic module (210).

More specifically, the driving unit (130) may activate or deactivate the second auxiliary power supply unit (120) depending on the magnitude of the voltage applied from the photovoltaic module (210).

When generating the auxiliary power by taking power from the photovoltaic module or the grid, two different auxiliary power sources may be available using diodes, as shown in FIG. 2. Auxiliary power source 1 (Aux1 DC), which is connected to the photovoltaic module (PV module) or battery, can output a voltage of 14V, and auxiliary power source 2 (Aux2 AC), which is connected to the grid, can also output a voltage of 14V. In this case, when solar power is generated, Aux1 can be used as the main auxiliary power source, and when there is no solar power generation, such as at night (night mode), Aux2 can be used as the main auxiliary power source. In this case, it can be implemented to provide only one auxiliary power output to the load by ORing the two output voltages by connecting one diode to the auxiliary power source 1 and two diodes to the auxiliary power source 2. In this case, if diodes are used, a voltage drop of about 0.7V per diode occurs, resulting in losses, and since auxiliary power supply 2 operates in burst mode even when solar power is generated, it may be vulnerable to losses and EMI due to intermittent operation of auxiliary power supply 2.

The driving unit (130) may activate or deactivate the second auxiliary power supply unit (120) depending on the magnitude of the voltage applied from the photovoltaic module (210), such that the second auxiliary power supply unit (120) may be deactivated in conditions where the second auxiliary power supply unit (120) does not need to be activated. The driving unit (130) may use the voltage of the photovoltaic module (210) as a condition for determining whether the second auxiliary power supply unit (120) is actuated or not.

The driving unit (130) may operate the second auxiliary power supply unit (120) when the voltage of the photovoltaic module (210) is below a first voltage, and stop the operation of the second auxiliary power supply unit (120) when the voltage of the photovoltaic module (210) is above a second voltage. The first voltage is a reference voltage at which the second auxiliary power supply unit (120) operates, and the second voltage is a reference voltage at which the second auxiliary power supply unit (120) stops operating. The first voltage may be lower than the second voltage, i.e., in a situation in which the first auxiliary power supply unit (110) generates auxiliary power, the second auxiliary power supply unit (120) may generate auxiliary power rather than the first auxiliary power supply unit (110) if an obstacle such as sunset, shade, or the like reduces the power generation of the photovoltaic module (210), making it difficult for the first auxiliary power supply unit (110) to generate enough auxiliary power. The reference voltage at which the second auxiliary power supply unit (120) operates may be set as a first voltage. The first voltage may be a voltage below which the first auxiliary power supply unit (110) does not generate auxiliary power, and may be set by the user.

In a situation where the second auxiliary power supply unit (120) generates auxiliary power, the first auxiliary power supply unit (110) may be allowed to generate auxiliary power rather than the second auxiliary power supply unit (120) if the power generation of the photovoltaic module (210) increases due to a sunrise or the like and the first auxiliary power supply unit (110) is able to generate sufficient auxiliary power. When the first auxiliary power supply unit (110) generates the auxiliary power, the second auxiliary power supply unit (120) does not need to operate, and the second auxiliary power supply unit (120) may stop operating and be turned off. A second voltage may be set as the reference voltage at which the second auxiliary power supply unit (120) is turned off. The second voltage may be a voltage at which the first auxiliary power supply unit (110) generates auxiliary power, and may be set by the user.

At this time, the first voltage may be set lower than the second voltage so that it has a hysteresis characteristic as shown in FIG. 3. If the operation of the second auxiliary power supply unit (120) is determined by only one voltage, the second auxiliary power supply unit (120) may be repeatedly switched on and off depending on the fluctuation of a relevant voltage in the vicinity of the voltage, resulting in large losses. By varying the first voltage and the second voltage to have hysteresis characteristics, as shown in FIG. 3, it is possible to prevent the on-off cycle from repeating due to small differences in voltage. For example, the first voltage may be 110 V and the second voltage may be 150 V. A gap of 40 V may be used to provide a hysteresis characteristic.

The driving unit (130) may include a sensing unit (131), a comparator (132), and a driving signal output unit (133) to output a driving signal to the second auxiliary power supply unit (120) according to the magnitude of the voltage of the photovoltaic module (210), as shown in FIG. 3, and may include a feedback voltage unit (134), as shown in FIG. 4.

The sensing unit (131) may sense the voltage of the photovoltaic module (210). The sensing unit (131) may sense the voltage of the DC link through which the power of the photovoltaic module (210) is fed to the power conversion device, i.e., the DC voltage fed to the power conversion device.

The comparator (132) may compare the sensed voltage of the photovoltaic module (210) with a reference voltage. The comparator (132) may compare the voltage of the photovoltaic module (210) with a first voltage or a second voltage. Here, the reference voltage may include a first voltage and a second voltage having a higher voltage than the first voltage such that the reference voltage has a hysteresis characteristic, i.e., the comparator (132) may compare whether the voltage of the sensed photovoltaic module (210) is lower than the first voltage in situations where the second voltage is higher than the first voltage, or higher than the second voltage in situations where the first voltage is lower than the second voltage.

The comparator (132) may output a first signal if the voltage of the photovoltaic module (210) is below the first voltage, and a second signal if the voltage of the photovoltaic module (210) is above the second voltage. Here, the first signal may be low or 0, and the second signal may be high or 1. Alternatively, the first signal may be high and the second signal may be low.

The driving signal output unit (133) may output a driving signal to the second auxiliary power supply unit (120) according to the output of the comparator (132). If the voltage of the photovoltaic module (210) is lower than the first voltage, which is a reference voltage to generate auxiliary power to the second auxiliary power supply unit (120), according to the comparison result of the comparator (132), the driving signal output unit (133) may output a driving signal to the second auxiliary power supply unit (120) to turn on the second auxiliary power supply unit (120).

Furthermore, in the situation of generating auxiliary power with the second auxiliary power supply unit (120), if the voltage of the photovoltaic module (210) is higher than the second voltage, which is the reference voltage for generating auxiliary power with the first auxiliary power supply unit (110), according to the comparison result of the comparator (132), the driving signal output unit (133) may output a driving signal to the second auxiliary power supply unit (120) for turning off the second auxiliary power supply unit (120). Alternatively, the driving signal output unit may block the driving signal output to the second auxiliary power supply unit (120).

The driving signal output unit (133) may output a first driving signal to drive the second auxiliary power supply unit (120) and a second driving signal to stop driving the second auxiliary power supply unit (120). The driving signal output unit (133) may include an enable/disable circuit. The first driving signal may be a disable signal and the second driving signal may be an enable signal, or conversely, the first driving signal may be an enable signal and the second driving signal may be a disable signal.

The driving signal output unit (133) may include a first photocoupler (820). The photocoupler is a photocomposite device including a light emitting element and a light receiving element, wherein the light emitting element operates to generate light and the light receiving element operates to receive light generated by the light emitting element, and may include a light emitting diode as the light emitting element and a transistor as the light receiving element. Here, when the output of the comparator (132) is a first signal, the first photocoupler (820) may not operate to output a first driving signal, and when the output of the comparator (132) is a second signal, the first photocoupler (820) may operate to output a second driving signal.

The feedback voltage unit (134) may reduce the output of the second auxiliary power supply unit to a third voltage or lower according to the output of the comparator (132). When the second auxiliary power supply unit (120) is turned on and operated, the magnitude of the voltage generated by the second auxiliary power supply unit (120) may be lowered to the third voltage or lower than the voltage of the auxiliary power generated by the first auxiliary power supply unit (110). For example, when the voltage of the auxiliary power source generated by the first auxiliary power supply unit (110) is 20 V, the voltage of the auxiliary power source generated by the second auxiliary power supply unit (120) may be controlled to 18 V.

The feedback voltage unit (134) may include a second photocoupler (920), and when the output of the comparator (132) is a first signal, the second photocoupler (920) may operate to reduce the output of the second auxiliary power supply unit to a third voltage or lower.

Furthermore, when the input voltage of the photovoltaic module (210) and the grid (220) is below a threshold, the first auxiliary power supply unit (110) may receive power from the battery (230) to generate auxiliary power. When the input voltage of the photovoltaic module (210) and the grid (220) is below a threshold, i.e., when it is difficult to generate sufficient auxiliary power using the photovoltaic module (210) and the grid (220), the first auxiliary power supply unit (110) connected to the battery (230) may generate the auxiliary power using the power charged in the battery (230). In this way, the auxiliary power can be kept on at all times.

An auxiliary power supply device according to an exemplary embodiment of the present invention may be implemented as shown in FIG. 6. The first auxiliary power supply unit (110), Aux1 DC, may be connected to the photovoltaic (PV) module (210), the solar power generation module, and the battery to generate the auxiliary power required for the load (240) using DC power, and the second auxiliary power supply unit (120), Aux2 AC, may be connected to the grid (220) to generate the auxiliary power. The second auxiliary power supply unit (120) may include a sensing unit (131) that senses the voltage of the photovoltaic module (210), a comparator (132) that compares the voltage with a reference voltage, an enable & disable circuit, an enable signal output unit (133) that outputs an enable signal according to the output of the comparator (132), and a feedback voltage circuit, a feedback voltage unit that controls the output voltage of the second auxiliary power supply unit (120) according to the output of the comparator (132).

The sensing unit (131) and the comparator (132) may be implemented as shown in FIG. 7. The sensing unit (131) may sense the voltage of the photovoltaic module (210) as a voltage of the DC link (V_DC-link, 710). The sensing unit (131) may be performed using a resistor divider and an op-amp. The comparator (132) may compare the sensed voltage (V_SEN, 720) to the reference voltage (V_REF, 730) and output the result (AUX2_EN, 740).

The driving signal output unit (133) may be implemented as shown in FIG. 8. The result of the comparator (AUX2_EN, 810) is inputted, the first photocoupler (820) is operated according to the value, and the driving signal (830) may be outputted depending on whether the first photocoupler (820) is operated or not. If the result of the comparator (810) is a first signal (low), the first photocoupler (820) is not operated and a first driving signal (disable) is outputted, and if the result of the comparator (810) is a second signal (high), the first photocoupler (820) is operated and a second driving signal (enable) is outputted.

The feedback voltage unit (134) may be implemented as shown in FIG. 9. The result of the comparator (AUX2_EN, 910) is inputted, and the second photocoupler (920) is operated according to the value, and the output of the second auxiliary power supply unit (120) may be controlled according to whether the second photocoupler (920) is operated or not. If the result of the comparator (810) is a first signal (low), the second photocoupler (920) is actuated, causing the feedback voltage to increase to control the output of the second auxiliary power supply unit (120), and if the result of the comparator (810) is a second signal (high), the second photocoupler (920) is not actuated, causing the feedback voltage to decrease to stop controlling the output of the second auxiliary power supply unit (120).

As described above, according to the auxiliary power supply device (100) according to an exemplary embodiment of the present invention, when the voltage of the photovoltaic module (210) is lower than the first voltage, the output of the comparator (132) outputs a first signal, and the first photocoupler (820) of the driving signal output unit (133) is not operated so that a first driving signal is outputted to operate the second auxiliary power supply unit (120). At this time, the second photocoupler (920) of the feedback voltage unit (134) may operate so that the output voltage of the second auxiliary power supply unit (120) is controlled below the third voltage. Further, when the voltage of the photovoltaic module (210) is higher than the second voltage, the output of the comparator (132) may output a second signal, and the first photocoupler (820) of the driving signal output unit (133) may operate to output a second driving signal to turn off the second auxiliary power supply unit (120). At this time, the second photocoupler (920) of the feedback voltage unit (134) may not operate. This allows the first auxiliary power supply unit (110) to be switched on and off so that the auxiliary power supply unit does not operate unnecessarily, enabling efficient generation of auxiliary power without losses and improving EMI characteristics.

FIG. 10 is a block diagram of a power conversion device according to an exemplary embodiment of the present invention.

The power conversion device (300) according to an exemplary embodiment of the present invention may comprise: a power conversion unit (310) that converts power inputted from a photovoltaic module (210) and outputs it to a grid (220) or charges a battery (230); and an auxiliary power unit (320) that generates auxiliary power to operate the power conversion unit (310).

The power conversion unit (310) may convert the voltage of the power inputted from the photovoltaic module (210) to a voltage suitable for the grid (220) and outputs it. The power conversion unit (310) may convert the input voltage to a higher or lower voltage. Alternatively, the power conversion unit (310) may convert the input current to a higher or lower current. The power conversion unit (310) may include an inverter to convert the power.

The auxiliary power unit (320) may supply power required for the power conversion unit (310) to perform operations for converting power. The power conversion unit (310) may include an inverter, a controller for operating the inverter, and the like, and the switching elements included in the inverter may require power to operate, and the auxiliary power unit (320) may provide the power required for those elements to operate. The detailed description of the auxiliary power unit (320) of the power conversion device according to an exemplary embodiment of the present invention corresponds to the detailed description of the auxiliary power supply unit in FIGS. 1 to 9, and redundant descriptions will be omitted hereinafter.

One having ordinary knowledge in the technical field to which the present embodiments relate will understand that variations may be implemented without departing from the essential characteristics of the materials described above. The disclosed methods are therefore to be considered from an illustrative and not a limiting point of view. The scope of the invention is shown in the claims of the patent and not in the foregoing description, and all differences within the scope of the claims are to be construed as being included in the invention.

The invention claimed is:

1. An auxiliary power supply device for generating auxiliary power of a power conversion device, comprising:
- a first auxiliary power supply unit configured to receive power applied from a photovoltaic module and generate auxiliary power therefrom;
- a second auxiliary power supply unit configured to receive power applied from a grid and generates auxiliary power therefrom; and
- a driving unit configured to output a driving signal to the second auxiliary power supply unit according to a magnitude of voltage of the photovoltaic module, wherein the driving unit comprises:
- a sensing unit configured to sense voltage of the photovoltaic module;
- a comparator configured to compare the sensed voltage of the photovoltaic module with a reference voltage; and
- a driving signal output unit configured to output a driving signal to the second auxiliary power supply unit according to an output of the comparator.

2. The auxiliary power supply device of claim 1, wherein the driving unit operates the second auxiliary power supply unit when voltage of the photovoltaic module is below a first voltage, and stops operating the second auxiliary power supply unit when voltage of the photovoltaic module is above a second voltage.

3. The auxiliary power supply device of claim 2, wherein the first voltage is lower than the second voltage.

4. The auxiliary power supply device of claim 1, wherein the comparator compares the voltage of the photovoltaic module with a first voltage or a second voltage.

5. The auxiliary power supply device of claim 1, wherein the comparator outputs a first signal when the voltage of the photovoltaic module is below a first voltage, and outputs a second signal when the voltage of the photovoltaic module is above a second voltage.

6. The auxiliary power supply device of claim 5, wherein the driving signal output unit comprises a first photocoupler, and when the output of the comparator is the first signal, the first photocoupler is not operated to output a first driving signal, and when the output of the comparator is a second signal, the first photocoupler is operated to output a second driving signal.

7. The auxiliary power supply device of claim 1, comprising:
- a feedback voltage unit configured to lower an output of the second auxiliary power supply unit to equal or less to a third voltage according to the output of the comparator.

8. The auxiliary power supply device of claim 7, wherein the feedback voltage unit comprises a second photocoupler, and when the output of the comparator is a first signal, the second photocoupler is operated to reduce the output of the second auxiliary power supply unit to equal or less to a third voltage.

9. The auxiliary power supply device of claim 1, wherein when input voltages of the photovoltaic module and the grid are below a threshold, the first auxiliary power supply unit receives power from a battery to generate auxiliary power.

10. A power conversion device, comprising:

a power conversion unit configured to convert power inputted from a photovoltaic module and output it to a grid or charge a battery; and an auxiliary power supply unit configured to generate auxiliary power to operate the power conversion device, wherein the auxiliary power supply unit comprises:

a first auxiliary power supply unit configured to receive power applied from the photovoltaic module and generate auxiliary power therefrom;

a second auxiliary power supply unit configured to receive power applied from the grid and generate auxiliary power therefrom; and a driving unit configured to output a driving signal to the second auxiliary power supply unit according to a magnitude of voltage of the photovoltaic module, wherein the driving unit comprises:

a sensing unit configured to sense voltage of the photovoltaic module;

a comparator configured to compare the sensed voltage of the photovoltaic module with a reference voltage; and a driving signal output unit configured to output a driving signal to the second auxiliary power supply unit according to an output of the comparator.

11. The power conversion device of claim 10, wherein the driving unit operates the second auxiliary power supply unit when voltage of the photovoltaic module is below a first voltage, and stops operating the second auxiliary power supply unit when voltage of the photovoltaic module is above a second voltage.

12. The power conversion device of claim 11, wherein the first voltage is lower than the second voltage.

13. The power conversion device of claim 10, wherein the comparator compares the voltage of the photovoltaic module with a first voltage or a second voltage.

14. The power conversion device of claim 10, wherein the comparator outputs a first signal when the voltage of the photovoltaic module is below a first voltage, and outputs a second signal when the voltage of the photovoltaic module is above a second voltage.

15. The power conversion device of claim 14, wherein the driving signal output unit comprises a first photocoupler, and when the output of the comparator is the first signal, the first photocoupler is not operated to output a first driving signal, and when the output of the comparator is a second signal, the first photocoupler is operated to output a second driving signal.

16. The power conversion device of claim 10, comprising:

a feedback voltage unit configured to lower an output of the second auxiliary power supply unit to equal or less to a third voltage according to the output of the comparator.

17. The power conversion device of claim 16, wherein the feedback voltage unit comprises a second photocoupler, and when the output of the comparator is a first signal, the second photocoupler is operated to reduce the output of the second auxiliary power supply unit to equal or less to a third voltage.

18. The power conversion device of claim 10, wherein when input voltages of the photovoltaic module and the grid are below a threshold, the first auxiliary power supply unit receives power from a battery to generate auxiliary power.

* * * * *